United States Patent [19]

Goldmann et al.

[11] Patent Number: 4,759,801
[45] Date of Patent: Jul. 26, 1988

[54] PIGMENT PREPARATIONS

[75] Inventors: Jürgen Goldmann, Münchenstein; Bansi L. Kaul, Biel-Benken, both of Switzerland

[73] Assignee: Sandoz Ltd., Basel, Switzerland

[21] Appl. No.: 884,116

[22] Filed: Jul. 10, 1986

[30] Foreign Application Priority Data

Jul. 17, 1985 [DE] Fed. Rep. of Germany ....... 3525431

[51] Int. Cl.$^4$ ............................................. C04B 14/00
[52] U.S. Cl. ................................... 106/502; 106/499; 106/505; 524/88; 524/96; 524/358; 524/485; 524/190; 524/93
[58] Field of Search ............................ 106/288 Q, 309

[56] References Cited

U.S. PATENT DOCUMENTS

| | | | |
|---|---|---|---|
| 4,158,572 | 6/1979 | Blackburn et al. | 106/309 |
| 4,221,606 | 9/1980 | Funatsu et al. | 106/288 Q |
| 4,227,936 | 10/1980 | Osswald et al. | 106/309 |
| 4,260,424 | 4/1981 | Mizoguchi et al. | 106/309 |
| 4,302,254 | 11/1981 | Landler | 106/309 |
| 4,325,862 | 4/1982 | Schuster | 524/87 |
| 4,371,642 | 2/1983 | Jaffe | 106/309 |
| 4,548,968 | 10/1985 | Jaffe | 106/309 |
| 4,589,922 | 5/1986 | Donegan | 106/309 |

*Primary Examiner*—Paul Lieberman
*Assistant Examiner*—Willie J. Thompson
*Attorney, Agent, or Firm*—Gerald D. Sharkin; Richard E. Vila; Thomas C. Doyle

[57] ABSTRACT

A method for preparing a pigment preparation comprising kneading a pigment presscake (comprising a pigment and water and/or one or more organic liquids) at a temperature in the range 80° to 200° C. under vacuum together with a thermoplastic material, thereby at the same time removing the water and/or any organic liquids present. These preparations are useful for coloring polymeric material.

21 Claims, No Drawings

PIGMENT PREPARATIONS

The invention relates to pigment preparations. At present pigment preparations (master batches) which are used for coloring thermoplastics, e.g. synthetic fibres or synthetic resins are produced by extruding the finely-ground dry pigment with the thermoplastic material, i.e. synthetic waxes or synthetic resins, at extrusion temperatures of up to 300° C. This traditional process has the following disadvantages:

(1) It uses a great deal of energy. The pigments employed have to be dried and ground in a special apparatus using special operations, prior to extrusion.
(2) The pigments are subjected to high temperatures, as a result of which the purity of shade and colour strength of heat-sensitive pigments may be adversely affected.
(3) The process must be carried out using pigment powders that form dust particles which is undesirable for hygienic reasons.
(4) The pigment content of preparations (master batches) so produced is usually at most 30%, though more highly concentrated pigment preparations can be prepared.

To alleviate these disadvantages according to the invention there is provided a method for preparing a pigment preparation comprising:

kneading a pigment presscake (comprising a pigment and water and/or one or more organic liquids) at a temperature in the range from 80° to 200° C. inclusive under vacuum together with a thermoplastic material thereby at the same time removing the water and/or any organic liquid present.

The pigment preparations so produced are usually in powder or granule form.

The pressure at which the kneading is effected is not critical, so long as it permits easy removal of the water and/or organic liquid. Preferably, it is in the range 30 to 80 mm Hg.

Preferably a method according to the invention is carried out at a temperature in the range 80° to 160° C. inclusive. More preferably the temperature is such as to cause the thermoplastic material to soften, but remain in particulate form, so that the pigment becomes embedded therein during the kneading.

Preparations prepared by a method according to the invention have several advantages over those which are produced by the abovementioned traditional method, as follows:

(1) The process according to the invention is energy-saving. By employing pigment presscakes, the steps of drying and grinding the pigment are avoided.
(2) Heat-sensitive pigments can be formulated into pigment preparations more easily since the maximum temperature of a method of the invention is 200° C., which is considerably less than for a normal extrusion process.
(3) The plastics which are coloured by the preparations produced by a method according to the invention have a higher purity of colour and have a higher colour yield than when using preparations which were produced according to known methods.
(4) The use of dust-forming pigment powders is avoided to a large extent.
(5) More highly concentrated pigment preparations are produced, with a pigment content of up to 60%.

Preferably pigment presscakes used in a method according to the invention comprise 20 to 80% pigment and 80 to 20% water and/or organic liquid.

The pigment used in the presscake is preferably selected from: azo-condensation, isoindolinone, dioxazine, phthalocyanine, anthraquinone and perylene pigments. The unground pigment is usually of a size in the range 1 to 30 microns.

Preferably the organic liquid that may be contained in the presscake for use in a method according to the invention is selected from toluene, xylene, chlorobenzene, dichlorobenzene, nitrobenzene, di-methylformamide, alcohols, e.g. methanol, ethanol, n- or i-propanol, n- or i-butanol.

Preferably the thermoplastic material used in a method according to the invention is polyethylene, polyethylene wax, polypropylene, polypropylene wax, polyvinyl chloride, polyamide, polystyrene, polyacrylonitrile, polyvinyl acetate, polymethacrylic ester or polyester. It is preferably in the form of particles larger than the pigment particles, e.g. about 1 to 500 mm. More preferably it is in granular, especially powdered form.

Preferably the weight ratio of pigment:thermoplastic is in the range 3:2 to 1:4.

With pigments which have poor dispersibility, it may be advantageous to add one or more dispersing agents in a method according to the invention. In such a case preferred dispersing agents are polycondensation products of alkylene oxides (preferably ethylene oxide) with higher fatty alcohols (e.g. stearyl alcohol with 20 mols of ethylene oxide); aralkyl sulphonates, e.g. dodecylbenzene sulphonate; natural resins, e.g. abietic acid and its esters; metal salts of fatty acids, e.g. calcium stearate, lead stearate and tin stearate; fatty amines, e.g. stearylamine; salts of primary fatty amines with carboxylic acids, e.g. oleylaminoacetate, coconut oil aminoacetate; fatty acid amides, e.g. oleylamide and ethylenebisoleylamide; fatty acid esters, e.g. glyceryl monostearate; amine or phosphine oxides, e.g. dodecyl-dimethylamine oxide and oleyl-dimethylamine oxide; mineral, animal, vegetable or artificial waxes, e.g. montan wax, polyethylene wax. These dispersing agents are generally used in a quantity of between 0.5 and 5 percent by weight, calculated on the amount of pigment (100% by dry weight) present.

The pigment preparations (resulting from a process according to the invention) in powder or granule form are used as pigment concentrates (master batches) for colouring synthetic compositions, including solvent-free plastics (e.g. polyethylene, polypropylene, polystyrene, polyacrylonitrile, polyvinyl chloride, polyvinyl acetate, polyester, polyacrylates etc.) and plastics which contain solvents (especially finishes, e.g. alkyd-/melamine-formaldehyde finishes).

In the following Examples, all parts and percentages are by weight and all temperatures given are in degrees Centigrade.

EXAMPLE 1

6200 Parts of an aqueous presscake (having a pigment content of 48.4%) of C.I. Pigment Red 48.3 and 3000 parts of non-polar polypropylene wax (powder) are kneaded for 1 hour at 20° to 40° in a double-basin kneader. Steam is passed into the casing of the kneader, which is heated to 100°, and the mass is worked until dry, which takes about 4 hours, under a vacuum of 50 mm Hg. A powdery pigment preparation containing 50% pigment is thus obtained, which is eminently suitable for colouring polypropylene.

Compared with a pigment preparation which is produced by a known extrusion process described e.g. in U.S. Pat. No. 4,325,862 from the same starting materials as given in Example 1, the preparation produced according to the invention, has 20% more colour strength, is 1.5 CIELAB units purer (measured on a polypropylene plate which is coloured according to Example 3) and it has excellent dispersibility (Pressure Index 0 after 60 minutes).

EXAMPLE 2

The procedure as given in Example 1 is repeated using 7,300 parts of a moist presscake of C.I. Pigment Yellow 155 (having a pigment content of 41.1%) and 3000 parts of powdery polymethylmethacrylate (molecular weight of about 10,000). The powdery pigment preparation containing 50% pigment thus obtained is eminently suitable for dyeing finishes, especially alkyd/melamine-formaldehyde finishes.

Compared with a preparation produced by the process described in U.S. Pat. No. 4,325,862, using C.I. Pigment Yellow 155, a preparation produced according to the invention has 30% more colour strength and considerably better gloss effect. The Reflectometer value of the preparation produced according to the invention is 91% compared with 53% for the preparation according to U.S. Pat. No. 4,325,862.

EXAMPLE 3

100 Parts of commercial polypropylene powder, 2 parts of commercial titanium dioxide white pigment and 0.2 parts of the pigment preparation prepared according to Example 1, are plasticised on a laboratory kneader (commercially available as a Gelimat), whereby the pigment preparation and the titanium white pigment are dispersed finely and evenly in the polypropylene. The mass is then pressed into a plate of 0.3 mm thickness.

The resultant dyeing has 20% more colour strength and is 1.5 CIELAB units purer than a dyeing made in the same way, but using a preparation which was produced according to the method of U.S. Pat. No. 4,325,862 from the same starting materials as given in Example 3.

In the Examples, the abbreviation C.I. refers to Colour Index.

What is claimed is:

1. A method for preparing a substantially dry pigment preparation which comprises kneading a thermoplastic material together with a pigment presscake comprising a pigment and a liquid at a temperature in the range from 80° to 200° C. inclusive under vacuum, thereby at the same time removing the liquid, said liquid being selected from the group consisting of water, at least one organic liquid and combinations of water and at least one organic liquid.

2. A method according to claim 1, which is carried out at a temperature in the range of 80° to 160° C.

3. A method according to claim 1, in which the pigment presscake used comprises 20 to 80% pigment and 80 to 20% liquid.

4. A method according to claim 1, in which any organic liquid present is selected from toluene, xylene, chlorobenzene, dichlorobenzene, nitrobenzene, dimethylformamide and alcohols.

5. A method according to claim 1, in which the pigment used is selected from azo, azo condensation, isoindolinone, dioxazine, phthalocyanine, anthraquinone and perylene pigments.

6. A method according to claim 1, in which the thermoplastic material is selected from polyethylene polyethylene wax, polypropylene, polypropylene wax, polyvinyl chloride, polyamide, polystyrene, polyacrylonitrile, polyvinyl acetate, polymethacrylic ester and polyester.

7. A method according to claim 1, in which 0.5 to 5% by weight of one or more dispersing agents calculated on the amount of pigment, by dry weight, are present.

8. A process for colouring a thermoplastic material comprising adding a composition prepared according to the method of claim 1 to the material.

9. A method according to claim 1 wherein the kneading is effected at a pressure in the range 30 to 80 mm. Hg.

10. A method according to claim 1 wherein the thermoplastic material is in particulate form and the kneading is effected at a temperature effective to cause the thermoplastic material to soften but remain in particulate form, whereby the pigment becomes embedded therein.

11. A method according to claim 1 wherein the weight ratio of pigment to thermoplastic material is in the range 3:2 to 1:4.

12. A method according to claim 1 wherein the pigment is of a size in the range 1 to 30 microns and the thermoplastic material is in the form of particles of a size in the range 1 to 500 mm.

13. A method according to claim 10 wherein the weight ratio of pigment to thermplastic material is in the range 3:2 to 1:4.

14. A method according to claim 10 wherein the kneading is effected at a pressure in the range 30 to 80 mm. Hg.

15. A method according to claim 10 wherein the pigment presscake comprises 20 to 80% pigment and 80 to 20% liquid.

16. A method according to claim 10, in which the thermoplastic material is selected from polyethylene, polyethylene wax, polypropylene, polypropylene wax, polyvinyl chloride, polyamide, polystyrene, polyacrylonitrile, polyvinyl acetate, polymethacrylic ester and polyester.

17. A method according to claim 11 wherein the kneading is effected at a pressure in the range 30 to 80 mm. Hg.

18. A method according to claim 13 wherein the kneading is effected at a pressure in the range 30 to 80 mm. Hg.

19. A method according to claim 16 wherein the weight ratio of pigment to thermplastic material is in the range 3:2 to 1:4.

20. A method according to claim 19, in which any organic liquid present is selected from toluene, xylene, chlorobenzene, dichlorobenzene, nitrobenzene, dimethylformamide and alcohols.

21. A method according to claim 18 wherein the pigment is of a size in the range 1 to 30 microns and the thermoplastic material is in the form of particles of a size in the range 1 to 500 mm.

* * * * *